US011845051B2

(12) United States Patent
Kikugawa et al.

(10) Patent No.: US 11,845,051 B2
(45) Date of Patent: Dec. 19, 2023

(54) AMMONIA SYNTHESIS CATALYST, METHOD OF PRODUCING THE SAME, AND METHOD OF SYNTHESIZING AMMONIA USING THE SAME

(71) Applicant: TOYOTA JIDOSHA KABUSHIKI KAISHA, Toyota (JP)

(72) Inventors: Masashi Kikugawa, Nagakute (JP); Yoshihiro Goto, Nagakute (JP); Haruo Imagawa, Nagakute (JP); Mitsuru Matsumoto, Nagakute-shi (JP); Akinori Satou, Mishima (JP); Marie Ishikawa, Nagoya (JP); Tetsuya Namba, Koriyama (JP); Hideyuki Matsumoto, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/716,354

(22) Filed: Apr. 8, 2022

(65) Prior Publication Data

US 2022/0331783 A1 Oct. 20, 2022

(30) Foreign Application Priority Data

Apr. 19, 2021 (JP) .............................. JP2021-070539
Nov. 4, 2021 (JP) .............................. JP2021-180347

(51) Int. Cl.
*B01J 23/46* (2006.01)
*C01C 1/04* (2006.01)
*B01J 23/10* (2006.01)

(52) U.S. Cl.
CPC .............. *B01J 23/462* (2013.01); *B01J 23/10* (2013.01); *C01C 1/0411* (2013.01)

(58) Field of Classification Search
CPC . B01J 23/10; B01J 23/462; B01J 23/63; B01J 2523/00; C01C 1/0411
See application file for complete search history.

(56) References Cited

U.S. PATENT DOCUMENTS

2022/0106193 A1 4/2022 Kikugawa et al.
2022/0234886 A1 7/2022 Yamazaki et al.

FOREIGN PATENT DOCUMENTS

CN 112007641 A 12/2020
JP H02-198639 A 8/1990
(Continued)

OTHER PUBLICATIONS

Machine translation of Mezentseva etal (Year: 2015).*
(Continued)

*Primary Examiner* — Brian A McCaig
(74) *Attorney, Agent, or Firm* — Oliff PLC

(57) ABSTRACT

An ammonia synthesis catalyst, includes a composite oxide carrier in which at least one additive metal element selected from the group consisting of titanium (Ti), zirconium (Zr), hafnium (Hf), aluminum (Al), gallium (Ga), indium (In), silicon (Si), germanium (Ge), and tin (Sn) is solid-solutionized in a composite oxide containing cerium (Ce) and a lanthanide other than Ce and having a composition represented by the following formula:

$$Ce_x A_{1-x-y} B_y O_d$$

(in the formula, A represents a lanthanide other than Ce, B represents the additive metal element, x represents a molar fraction of Ce, y represents a molar fraction of the additive metal element, 1−x−y represents a molar fraction of a lanthanide other than Ce, x and y satisfy $0.1 \leq x \leq 0.9$, $0.01 \leq y \leq 0.3$, and $0.11 \leq x+y \leq 0.91$, d represents a molar ratio of oxygen atoms, and $1.5 \leq d \leq 2$ is satisfied);
(Continued)

and ruthenium (Ru) supported on the composite oxide carrier.

5 Claims, 2 Drawing Sheets

(56) References Cited

FOREIGN PATENT DOCUMENTS

| | | | |
|---|---|---|---|
| JP | H06-079177 A | 3/1994 | |
| JP | 2009-254981 A | 11/2009 | |
| JP | 2016-159209 A | 9/2016 | |
| JP | 2018-001096 A | 1/2018 | |
| RU | 2541316 C1 * | 2/2015 | ............. B01J 23/63 |

OTHER PUBLICATIONS

Ogura et al., "Efficient ammonia synthesis over a Ru/La0.5Ce0.5O1.75 catalyst pre-reduced at high temperature," Chemical Science, 2018, vol. 9, pp. 2230-2237.

Lin et al., "Effects of Pr Doping on Structure and Catalytic Performance of Ru/CeO2 Catalyst for Ammonia Synthesis," Chinese Journal of Catalysis, 2012, vol. 33, No. 3, pp. 536-542.

U.S. Appl. No. 17/582,483, filed Jan. 24, 2022 in the name of Kiyoshi Yamazaki et al.

Nagaoka et al., "Influence of basic dopants on the activity of Ru/Pr6O11 for hydrogen production by ammonia decomposition," International Journal of Hydrogen Energy, 2014, vol. 39, pp. 20731-20735.

Jun. 6, 2023 Office Action issued in U.S. Appl. No. 17/582,483.

U.S. Appl. No. 17/493,080, filed Oct. 4, 2021 in the name of Masashi Kikugawa et al.

* cited by examiner

AMMONIA SYNTHESIS CATALYST, METHOD OF PRODUCING THE SAME, AND METHOD OF SYNTHESIZING AMMONIA USING THE SAME

CROSS-REFERENCE TO RELATED APPLICATION

This application claims priority to Japanese Patent Application No. 2021-070539 filed on Apr. 19, 2021 and Japanese Patent Application No. 2021-180347 filed on Nov. 4, 2021, each incorporated herein by reference in its entirety.

BACKGROUND

1. Technical Field

The present disclosure relates to an ammonia synthesis catalyst, a method of producing the same, and a method of synthesizing ammonia using the same, and more specifically, to an ammonia synthesis catalyst on which ruthenium is supported on a ceria-based composite oxide carrier, a method of producing the same, and a method of synthesizing ammonia using the same.

2. Description of Related Art

In recent years, ammonia has been focused on as a component that can be applied to applications such as energy carriers of hydrogen energy. As a method of synthesizing such ammonia, a Haber-Bosch method using an iron catalyst as a catalyst has been industrially used in the past, but in recent years, studies on various types of ammonia synthesis catalysts have been conducted in order to synthesize ammonia under milder conditions than in the Haber-Bosch method.

For example, Japanese Unexamined Patent Application Publication No. 6-79177 (JP 6-79177 A) discloses an ammonia synthesis catalyst in which ruthenium is supported on a rare earth oxide, and describes that, as the rare earth oxide, oxides of any element from lanthanum having an atomic number of 57 to lutetium having an atomic number of 71 or a mixture thereof can be used, and describes that, among these, use of cerium oxide is particularly preferable.

In addition, in Yuta Ogura et al., Chemical Science, 2018, Vol. 9, pp. 2230 to 2237, an ammonia synthesis catalyst (Ru/La$_{0.5}$Ce$_{0.5}$O$_{1.75}$) in which ruthenium is supported on a ceria-lanthanum oxide composite oxide is disclosed, and it is described that the ammonia synthesis catalyst (Ru/La$_{0.5}$Ce$_{0.5}$O$_{1.75}$) has better ammonia synthesis activity than an ammonia synthesis catalyst (Ru/CeO$_2$) in which ruthenium is supported on ceria, an ammonia synthesis catalyst (Ru/La$_2$O$_3$) in which ruthenium is supported on lanthanum oxide, and an ammonia synthesis catalyst (Ru/Pr$_2$O$_3$) in which ruthenium is supported on praseodymium oxide.

In addition, in LIN Jianxin et al., Chinese Journal of Catalyst, 2012, Vol. 33, No. 3, pp. 536 to 542, an ammonia synthesis catalyst (Ru/CeO$_2$—PrO$_2$) in which ruthenium is supported on ceria doped with praseodymium is disclosed, and it is described that the ammonia synthesis catalyst (Ru/CeO$_2$—PrO$_2$) has better ammonia synthesis activity than an ammonia synthesis catalyst (Ru/CeO$_2$) in which ruthenium is supported on ceria.

However, also in the ammonia synthesis catalyst in which ruthenium is supported on a composite oxide carrier of cerium oxide and other rare earth oxides such as lanthanum oxide and praseodymium oxide, the ammonia synthesis activity is not sufficiently high, and a catalyst that exhibits higher ammonia synthesis activity is required.

SUMMARY

The present disclosure has been made in view of problems in the related art, and provides an ammonia synthesis catalyst which has excellent ammonia synthesis activity and can efficiently synthesize ammonia, a method of producing the same, and a method of synthesizing ammonia using the same.

The inventors conducted extensive studies in order to achieve the above object, and as a result, found that, when a composite oxide carrier containing cerium (Ce), a lanthanide other than Ce, and at least one additive metal element selected from the group consisting of titanium (Ti), zirconium (Zr), hafnium (Hf), aluminum (Al), gallium (Ga), indium (In), silicon (Si), germanium (Ge), and tin (Sn) at a predetermined molar ratio is produced by a polymerized complex method, a composite oxide carrier in which a predetermined amount of the additive metal element is solid-solutionized in a composite oxide containing Ce and a lanthanide other than Ce is obtained, an ammonia synthesis catalyst in which ruthenium (Ru) is supported on the composite oxide carrier has excellent ammonia synthesis activity, and when the ammonia synthesis catalyst is used, it is possible to efficiently synthesize ammonia, and thereby completed the present disclosure.

That is, the ammonia synthesis catalyst of the present disclosure includes a composite oxide carrier in which at least one additive metal element selected from the group consisting of titanium (Ti), zirconium (Zr), hafnium (Hf), aluminum (Al), gallium (Ga), indium (In), silicon (Si), germanium (Ge), and tin (Sn) is solid-solutionized in a composite oxide containing cerium (Ce) and a lanthanide other than Ce and having a composition represented by the following formula:

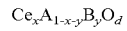

(in the formula, A represents a lanthanide other than Ce, B represents the additive metal element, x represents a molar fraction of Ce, y represents a molar fraction of the additive metal element, 1−x−y represents a molar fraction of a lanthanide other than Ce, x and y satisfy 0.1≤x≤0.9, 0.01≤y≤0.3, and 0.11≤x+y≤0.91, d represents a molar ratio of oxygen atoms, and 1.5≤d≤2 is satisfied); and ruthenium (Ru) supported on the composite oxide carrier.

In the ammonia synthesis catalyst of the present disclosure, a lanthanide other than Ce is preferably at least one selected from the group consisting of lanthanum (La) and praseodymium (Pr), and the additive metal element is preferably at least one selected from the group consisting of Ti, Zr, Al, and Si.

In addition, a method of producing an ammonia synthesis catalyst of the present disclosure includes a process in which, using a composite oxide precursor solution containing a salt of cerium (Ce), a salt of a lanthanide other than Ce, and a salt of at least one additive metal element selected from the group consisting of titanium (Ti), zirconium (Zr), hafnium (Hf), aluminum (Al), gallium (Ga), indium (In), silicon (Si), germanium (Ge), and tin (Sn) at a ratio in which x and y satisfy 0.1≤x≤0.9, 0.01≤y≤0.3, and 0.11≤x+y≤0.91 when x represents a molar fraction of Ce, y represents a molar fraction of the additive metal element, and 1−x−y represents a molar fraction of a lanthanide other than Ce, a composite oxide carrier in which the additive metal element is solid-solutionized in a composite oxide containing Ce and a lanthanide other than Ce is prepared by a polymerized complex method; and a process in which ruthenium (Ru) is supported on the composite oxide carrier to obtain a catalyst in which Ru is supported on the composite oxide carrier.

In addition, a method of synthesizing ammonia of the present disclosure includes bringing a gas containing hydrogen and nitrogen into contact with the ammonia synthesis catalyst of the present disclosure to synthesize ammonia.

Here, the reason why the ammonia synthesis catalyst of the present disclosure has excellent ammonia synthesis activity is not clearly understood, but the inventors speculate as follows. That is, the ammonia synthesis catalyst of the present disclosure includes a composite oxide carrier in which at least one additive metal element selected from the group consisting of Ti, Zr, Hf, Al, Ga, In, Si, Ge, and Sn is solid-solutionized in a composite oxide containing Ce and a lanthanide other than Ce, and Ru supported on the composite oxide carrier. In the composite oxide containing Ce and a lanthanide other than Ce, since the ionic radius ($La^{3+}$: 1.16 Å, $Pr^{3+}$: 1.126 Å, $Nd^{3+}$ to $Lu^{3+}$: 1.109 to 0.977 Å (the above is the Shannon ionic radius)) of the lanthanide other than Ce is larger than the ionic radius ($Ce^{4+}$: 0.97 Å) of Ce, it is speculated that oxygen atoms shared by atoms of the lanthanide other than Ce and Ce are far from Ce on average and are easily separated. It is speculated that, when the additive metal element is solid-solutionized in the composite oxide containing Ce and a lanthanide other than Ce in such a state, Ce is more easily reduced ($Ce^{4+} \rightarrow Ce^{3+}$), and donation of electrons from $Ce^{3+}$ to Ru is improved. As a result, it is speculated that, since the dissociation of $N_2$ on Ru is promoted, an ammonia synthesis reaction ($3H_2+N_2 \rightarrow 2NH_3$) is promoted, the ammonia synthesis activity being improved.

On the other hand, it is speculated that, when the additive metal element is solid-solutionized in ceria, since Ce in the ceria is stable in a tetravalent state, reducibility ($Ce^{4+} \rightarrow Ce^{3+}$) of Ce is not improved as much as with the composite oxide carrier according to the present disclosure, and donation of electrons from $Ce^{3+}$ to Ru is also not improved as much as with the ammonia synthesis catalyst of the present disclosure. As a result, it is speculated that, since the dissociation of $N_2$ on Ru is not promoted and the ammonia synthesis reaction ($3H_2+N_2 \rightarrow 2NH_3$) is also not promoted as much as with the ammonia synthesis catalyst of the present disclosure, the ammonia synthesis activity is not improved.

According to the present disclosure, it is possible to obtain an ammonia synthesis catalyst having excellent ammonia synthesis activity. In addition, it is possible to efficiently synthesize ammonia using such an ammonia synthesis catalyst.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
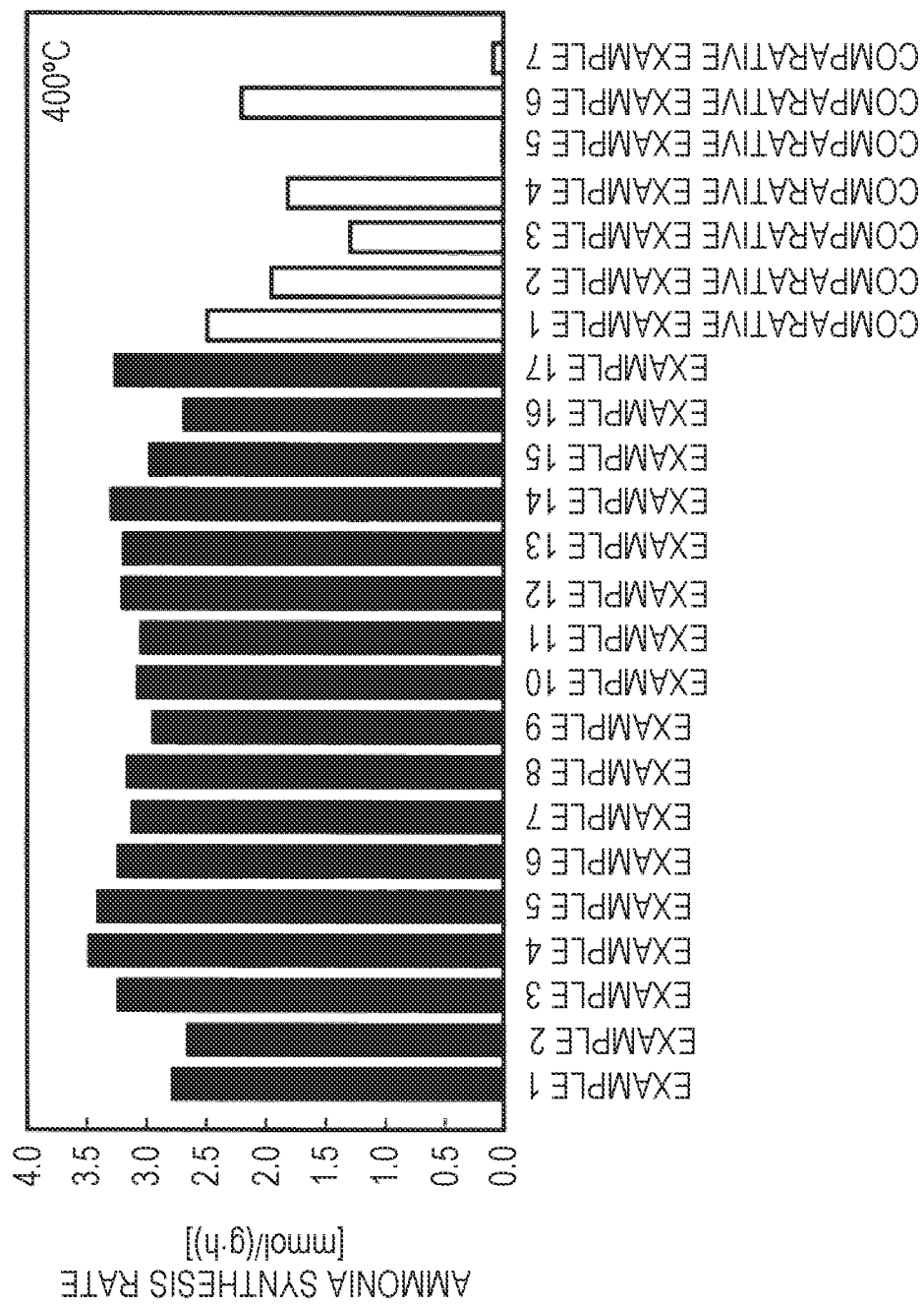
FIG. 1 is a graph showing ammonia synthesis rates of ammonia synthesis catalysts obtained in Examples 1 to 17 and Comparative Examples 1 to 7 at a reaction temperature of 400° C.

Hereinafter, preferable embodiments of the present disclosure will be described in detail.

[Ammonia Synthesis Catalyst]

First, an ammonia synthesis catalyst of the present disclosure will be described. The ammonia synthesis catalyst of the present disclosure includes a composite oxide carrier in which at least one additive metal element selected from the group consisting of titanium (Ti), zirconium (Zr), hafnium (Hf), aluminum (Al), gallium (Ga), indium (In), silicon (Si), germanium (Ge), and tin (Sn) is solid-solutionized in a composite oxide containing cerium (Ce) and a lanthanide other than Ce, and ruthenium (Ru) supported on the composite oxide carrier.

Examples of lanthanides other than Ce include lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). These lanthanides may be used alone or two or more thereof may be used in combination. In addition, among these lanthanides, La and Pr are preferable, and La is more preferable in order to improve ammonia synthesis activity in the obtained ammonia synthesis catalyst.

In addition, examples of additive metal elements include Group 4 elements such as Ti, Zr, and Hf in the periodic table, Group 13 elements such as Al, Ga, and In in the periodic table, and Group 14 elements such as Si, Ge, and Sn in the periodic table. These additive metal elements may be used alone or two or more thereof may be used in combination. In addition, among these additive metal elements, Ti, Zr, Al, and Si are preferable because cations thereof are stable in a reducing atmosphere.

In a composite oxide carrier according to the present disclosure, such an additive metal element is solid-solutionized in a composite oxide containing Ce and a lanthanide other than Ce. When the additive metal element is solid-solutionized in a composite oxide containing Ce and a lanthanide other than Ce, Ce is easily reduced ($Ce^{4+} \rightarrow Ce^{3+}$), and in the obtained ammonia synthesis catalyst, since donation of electrons from $Ce^{3+}$ to Ru is improved, the dissociation of $N_2$ on Ru is promoted, and the ammonia synthesis activity is improved. On the other hand, when the additive metal element is not solid-solutionized in a composite oxide containing Ce and a lanthanide other than Ce (for example, a composite oxide carrier composed of a mixture containing a composite oxide containing Ce and a lanthanide other than Ce and the additive metal element or a composite oxide carrier in which the additive metal element is supported on a composite oxide containing Ce and a lanthanide other than Ce), an effect of improving reducibility ($Ce^{4+} \rightarrow Ce^{3+}$) of Ce by the additive metal element cannot be obtained, and in the obtained ammonia synthesis catalyst, donation of electrons from $Ce^{3+}$ to Ru is not improved, and thus the dissociation of $N_2$ on Ru is not promoted, and the ammonia synthesis activity is not improved.

In addition, the composite oxide carrier has a composition represented by the following formula:

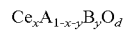

(in the formula, A represents a lanthanide other than Ce, B represents the additive metal element, x represents a molar fraction of Ce with respect to a total amount of Ce, the lanthanide other than Ce, and the additive metal element, y represents a molar fraction of the additive metal element with respect to a total amount of Ce, the lanthanide other than Ce, and the additive metal element, 1−x−y represents a molar fraction of a lanthanide other than Ce with respect to a total amount of Ce, the lanthanide other than Ce, and the additive metal element, and d represents a molar ratio of oxygen atoms with respect to a total amount of 1 mol of Ce, a lanthanide other than Ce, and the additive metal element, and is a value uniquely determined from a composition and valences of cations (Ce, a lanthanide other than Ce and the additive metal element)).

The molar fraction x of Ce needs to satisfy $0.1 \leq x \leq 0.9$, preferably satisfies $0.2 \leq x \leq 0.8$, and more preferably satisfies $0.3 \leq x \leq 0.7$. When the molar fraction x of Ce is less than the lower limit, in the obtained ammonia synthesis catalyst, the amount of electrons donated to Ru from $Ce^{3+}$ is reduced, the dissociation of $N_2$ on Ru is not promoted, and the ammonia synthesis activity decreases. On the other hand, when the molar fraction x of Ce exceeds the upper limit, since the content of the lanthanide other than Ce and the additive metal element is relatively reduced, an effect of improving reducibility ($Ce^{4+} \rightarrow Ce^{3+}$) of Ce by the lanthanide other than Ce and the additive metal element cannot be sufficiently obtained, and in the obtained ammonia synthesis catalyst, donation of electrons from $Ce^{3+}$ to Ru is not improved, and thus the dissociation of $N_2$ on Ru is not promoted, and it is difficult to improve the ammonia synthesis activity.

In addition, the molar fraction y of the additive metal element needs to satisfy $0.01 \leq y \leq 0.3$, preferably satisfies $0.02 \leq y \leq 0.25$, and more preferably satisfies $0.05 \leq y \leq 0.2$. When the molar fraction y of the additive metal element is less than the lower limit, an effect of improving reducibility ($Ce^{4+} \rightarrow Ce^{3+}$) of Ce by the additive metal element cannot be sufficiently obtained, and in the obtained ammonia synthesis catalyst, donation of electrons from $Ce^{3+}$ to Ru is not improved, and thus the dissociation of $N_2$ on Ru is not promoted, and it is difficult to improve the ammonia synthesis activity. On the other hand, when the molar fraction y of the additive metal element exceeds the upper limit, since the content of Ce is relatively reduced, in the obtained ammonia synthesis catalyst, the amount of electrons donated to Ru from $Ce^{3+}$ decreases, the dissociation of $N_2$ on Ru is not promoted, and the ammonia synthesis activity decreases, or since the content of the lanthanide other than Ce is relatively reduced, an effect of improving reducibility ($Ce^{4+} \rightarrow Ce^{3+}$) of Ce by the lanthanide other than Ce cannot be sufficiently obtained, and in the obtained ammonia synthesis catalyst, donation of electrons from $Ce^{3+}$ to Ru is not improved, and thus the dissociation of $N_2$ on Ru is not promoted, and it is difficult to improve the ammonia synthesis activity.

In addition, the sum (x+y) of the molar fraction x of Ce and the molar fraction y of the additive metal element needs to satisfy $0.11 \leq x+y \leq 0.91$ (that is, the molar fraction 1−x−y of the lanthanide other than Ce satisfies $0.89 \geq 1-x-y \geq 0.09$), preferably satisfies $0.15 \leq x+y \leq 0.87$ (that is, the molar fraction 1−x−y of the lanthanide other than Ce satisfies $0.85 \geq 1-x-y \geq 0.13$), and more preferably satisfies $0.21 \leq x+y \leq 0.81$ (that is, the molar fraction 1−x−y of the lanthanide other than Ce satisfies $0.79 \geq 1-x-y \geq 0.19$). When the x+y is less than the lower limit (that is, the molar fraction 1−x−y of the lanthanide other than Ce exceeds the upper limit), since the content of Ce is relatively reduced, the amount of electrons donated to Ru from $Ce^{3+}$ decreases, the dissociation of $N_2$ on Ru is not promoted, and the ammonia synthesis activity decreases, or since the content of the additive metal element is relatively reduced, an effect of improving reducibility ($Ce^{4+} \rightarrow Ce^{3+}$) of Ce by the additive metal element cannot be sufficiently obtained, and donation of electrons from $Ce^{3+}$ to Ru is not improved, and thus the dissociation of $N_2$ on Ru is not promoted, and it is difficult to improve the ammonia synthesis activity. On the other hand, when the x+y exceeds the upper limit (that is, the molar fraction 1−x−y of the lanthanide other than Ce is less than the lower limit), an effect of improving reducibility ($Ce^{4+} \rightarrow Ce^{3+}$) of Ce by the lanthanide other than Ce cannot be sufficiently obtained, donation of electrons from $Ce^{3+}$ to Ru is not improved, and thus the dissociation of $N_2$ on Ru is not promoted, and it is difficult to improve the ammonia synthesis activity.

The composite oxide carrier according to the present disclosure may contain Ce, a lanthanide other than Ce and a metal element other than the additive metal element as long as the effects of the present disclosure are not impaired. Such other metal elements are not particularly limited as long as they are metal elements used in the ammonia synthesis catalyst, and examples thereof include scandium (Sc), yttrium (Y), manganese (Mn), iron (Fe), cobalt (Co), nickel (Ni), and copper (Cu). When the composite oxide carrier contains such other metal elements, the content thereof is preferably 5 mol % or less, more preferably 1 mol % or less, and particularly preferably 0.1 mol % or less with respect to a total amount of Ce, the lanthanide other than Ce, the additive metal element, and the other metal element, and when the content of the other metal element exceeds the upper limit, the dissociation of $N_2$ on Ru is inhibited, and the ammonia synthesis activity tends to decrease.

The shape of the composite oxide carrier according to the present disclosure is not particularly limited, and examples thereof include a ring shape, a spherical shape, a columnar shape, a particle shape, and a pellet shape. Among these shapes, a particle shape is preferable because it is possible to support a larger amount of Ru in a high dispersible state. In addition, when the composite oxide carrier has a particle shape, the average particle size of the carrier is preferably 0.1 μm to 100 μm.

In addition, the specific surface area of the composite oxide carrier is not particularly limited, and is preferably 1 $m^2$/g to 300 $m^2$/g and more preferably 10 $m^2$/g to 200 $m^2$/g. When the specific surface area of the composite oxide carrier is less than the lower limit, since the dispersibility of Ru is lowered, the ammonia synthesis activity tends to decrease, and on the other hand, when the specific surface area exceeds the upper limit, since the heat resistance of the composite oxide carrier decreases, the ammonia synthesis activity tends to decrease. Here, such a specific surface area can be obtained by measuring a nitrogen adsorption isotherm of the composite oxide carrier and using a BET method based on the nitrogen adsorption isotherm.

In the ammonia synthesis catalyst of the present disclosure, Ru is supported on such a composite oxide carrier. The amount of Ru supported is not particularly limited, and is preferably 0.5 parts by mass to 10 parts by mass, and more preferably 1 part by mass to 5 parts by mass with respect to 100 parts by mass of the composite oxide carrier. When the amount of Ru supported is less than the lower limit, the ammonia synthesis activity tends to decrease, and on the other hand, when the amount of Ru supported exceeds the upper limit, since Ru sintering is likely to occur in some usage environments, the degree of dispersion of Ru, which is an active site, is lowered, it is difficult to obtain an effect corresponding to the amount of Ru supported, which tends to be disadvantageous in terms of costs and the like.

In addition, the average particle size of Ru supported on the composite oxide carrier is not particularly limited, and is preferably 0.5 nm to 100 nm, and more preferably 1 nm to 50 nm. When the average particle size of Ru is less than the lower limit, it tends to be difficult to use Ru in a metal state, and on the other hand, when the average particle size of Ru exceeds the upper limit, the amount of active sites as a catalyst tends to be significantly reduced.

The form of the ammonia synthesis catalyst of the present disclosure is not particularly limited, and examples thereof include a honeycomb-shaped monolith catalyst and a pellet-shaped pellet catalyst. In addition, the powdered ammonia synthesis catalyst may be disposed at a desired location without change.

[Method of Producing Ammonia Synthesis Catalyst]

Next, a method of producing an ammonia synthesis catalyst of the present disclosure will be described. The method of producing an ammonia synthesis catalyst of the present disclosure is a method including a process in which a composite oxide carrier in which the additive metal element is solid-solutionized in a composite oxide containing Ce and a lanthanide other than Ce is prepared using a composite oxide precursor solution containing a salt of cerium (Ce), a salt of a lanthanide other than Ce, and a salt of at least one additive metal element selected from the group consisting of titanium (Ti), zirconium (Zr), hafnium (Hf), aluminum (Al), gallium (Ga), indium (In), silicon (Si), germanium (Ge), and tin (Sn) at a predetermined ratio by a polymerized complex method [carrier preparation process] and a process in which ruthenium (Ru) is supported on the composite oxide carrier by an impregnation method and an evaporation drying method to obtain a catalyst in which Ru is supported on the composite oxide carrier [ruthenium supporting process].

[Carrier Preparation Process]

In the carrier preparation process, first, a composite oxide precursor solution containing a salt of Ce, a salt of a lanthanide other than Ce, and a salt of at least one additive metal element selected from the group consisting of Ti, Zr, Hf, Al, Ga, In, Si, Ge, and Sn at a predetermined ratio is prepared. Specifically, the composite oxide precursor solution is obtained by dissolving a salt of Ce, a salt of a lanthanide other than Ce and a salt of the additive metal element in a solvent.

The salt of Ce is not particularly limited as long as it is dissolved in a solvent, and examples thereof include cerium sulfate, cerium nitrate, cerium chloride, cerium acetate, and various cerium complexes.

The salt of the lanthanide other than Ce is not particularly limited as long as it is dissolved in a solvent, and examples thereof include sulfates, nitrates, chlorides, acetates, and various complexes of the lanthanide other than Ce. Examples of lanthanides other than Ce include lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). These lanthanides may be used alone or two or more thereof may be used in combination. In addition, among these lanthanides, La and Pr are preferable, and La is more preferable in order to improve the activity of the obtained ammonia synthesis catalyst.

The salt of the additive metal element is not particularly limited as long as it is dissolved in a solvent, and examples thereof include sulfates, nitrates, chlorides, acetates, and various complexes of the additive metal element. Examples of additive metal elements include Group 4 elements such as Ti, Zr, and Hf in the periodic table, Group 13 elements such as Al, Ga, and In in the periodic table, and Group 14 elements such as Si, Ge, and Sn in the periodic table. These additive metal elements may be used alone or two or more thereof may be used in combination. In addition, among these additive metal elements, Ti, Zr, Al, and Si are preferable because cations thereof are stable in a reducing atmosphere.

The solvent is not particularly limited as long as its salt is dissolved to produce Ce ions, ions of the lanthanide other than Ce, and ions of the additive metal element, and examples thereof include water, alcohols, and a mixed solvent thereof. Among these solvents, water is preferable in consideration of cost and safety.

In the composite oxide precursor solution, a salt of Ce, a salt of a lanthanide other than Ce, and a salt of the additive metal element are dissolved in the solvent so that the molar fraction x of Ce, the molar fraction y of the additive metal element, and the sum x+y of the molar fraction x of Ce and the molar fraction y of the additive metal element (in other words, the molar fraction 1−x−y of the lanthanide other than Ce) with respect to a total amount of Ce, the lanthanide other than Ce, and the additive metal element satisfy the following conditions.

The molar fraction x of Ce needs to satisfy $0.1 \leq x \leq 0.9$, preferably satisfies $0.2 \leq x \leq 0.8$, and more preferably satisfies $0.3 \leq x \leq 0.7$. When the molar fraction x of Ce is less than the lower limit, in the obtained ammonia synthesis catalyst, the amount of electrons donated to Ru from $Ce^{3+}$ is reduced, the dissociation of $N_2$ on Ru is not promoted, and the ammonia synthesis activity decreases. On the other hand, when the molar fraction x of Ce exceeds the upper limit, since the content of the lanthanide other than Ce and the additive metal element is relatively reduced, an effect of improving reducibility ($Ce^{4+} \rightarrow Ce^{3+}$) of Ce by lanthanide other than Ce and the additive metal element cannot be sufficiently obtained, and in the obtained ammonia synthesis catalyst, donation of electrons from $Ce^{3+}$ to Ru is not improved, and thus the dissociation of $N_2$ on Ru is not promoted, and it is difficult to improve the ammonia synthesis activity.

In addition, the molar fraction y of the additive metal element needs to satisfy $0.01 \leq y \leq 0.3$, preferably satisfies $0.02 \leq y \leq 0.25$, and more preferably satisfies $0.05 \leq y \leq 0.2$. When the molar fraction y of the additive metal element is less than the lower limit, an effect of improving reducibility ($Ce^{4+} \rightarrow Ce^{3+}$) of Ce by the additive metal element cannot be sufficiently obtained, and in the obtained ammonia synthesis catalyst, donation of electrons from $Ce^{3+}$ to Ru is not improved, and thus the dissociation of $N_2$ on Ru is not promoted, and it is difficult to improve the ammonia synthesis activity. On the other hand, when the molar fraction y of the additive metal element exceeds the upper limit, since the content of Ce is relatively reduced, in the obtained ammonia synthesis catalyst, the amount of electrons donated to Ru from $Ce^{3+}$ is reduced, the dissociation of $N_2$ on Ru is not promoted, the ammonia synthesis activity decreases, or since the content of the lanthanide other than Ce is relatively reduced, an effect of improving reducibility ($Ce^{4+} \rightarrow Ce^{3+}$) of Ce by the lanthanide other than Ce cannot be sufficiently obtained, and in the obtained ammonia synthesis catalyst, donation of electrons from $Ce^{3+}$ to Ru is not improved, and thus the dissociation of $N_2$ on Ru is not promoted, and it is difficult to improve the ammonia synthesis activity.

In addition, the sum (x+y) of the molar fraction x of Ce and the molar fraction y of the additive metal element needs to satisfy $0.11 \leq x+y \leq 0.91$ (that is, the molar fraction $1-x-y$ of the lanthanide other than Ce satisfies $0.89 \geq 1-x-y \geq 0.09$), preferably satisfies $0.15 \leq x+y \leq 0.87$ (that is, the molar fraction $1-x-y$ of the lanthanide other than Ce satisfies $0.85 \geq 1-x-y \geq 0.13$), and more preferably satisfies $0.21 \leq x+y \leq 0.81$ (that is, the molar fraction $1-x-y$ of the lanthanide other than Ce satisfies $0.79 \geq 1-x-y \geq 0.19$). When the x+y is less than the lower limit (that is, the molar fraction $1-x-y$ of the lanthanide other than Ce exceeds the upper limit), since the content of Ce is relatively reduced, in the obtained ammonia synthesis catalyst, the amount of electrons donated to Ru from $Ce^{3+}$ is reduced, the dissociation of $N_2$ on Ru is not promoted, and the ammonia synthesis activity decreases, or since the content of the additive metal element is relatively reduced, an effect of improving reducibility ($Ce^{4+} \rightarrow Ce^{3+}$) of Ce by the additive metal element cannot be sufficiently obtained, and in the obtained ammonia synthesis catalyst, donation of electrons from $Ce^{3+}$ to Ru is not improved, and thus the dissociation of $N_2$ on Ru is not promoted, and it is difficult to improve the ammonia synthesis activity. On the other hand, when the x+y exceeds the upper limit (that is, the molar fraction $1-x-y$ of the lanthanide other than Ce is less than the lower limit), an effect of improving reducibility ($Ce^{4+} \rightarrow Ce^{3+}$) of Ce by the lanthanide other than Ce cannot be sufficiently obtained, and in the obtained ammonia synthesis catalyst, donation of electrons from $Ce^{3+}$ to Ru is not improved, and thus the dissociation of $N_2$ on Ru is not promoted, and it is difficult to improve the ammonia synthesis activity.

In addition, the composite oxide precursor solution may contain Ce, a lanthanide other than Ce and a salt of a metal element other than the additive metal element as long as the effects of the present disclosure are not impaired. The salt of such other metal elements is not particularly limited as long as it is dissolved in the solvent, and examples thereof include sulfates, nitrates, chlorides, acetates, and various complexes of other metal elements. The other metal elements are not particularly limited as long as they are metal elements used in the ammonia synthesis catalyst, and examples thereof include scandium (Sc), yttrium (Y), manganese (Mn), iron (Fe), cobalt (Co), nickel (Ni), and copper (Cu). When the composite oxide precursor solution contains a salt of such other metal elements, the content thereof in terms of the other metal element is preferably 5 mol % or less, more preferably 1 mol % or less, and particularly preferably 0.1 mol % or less with respect to a total amount of Ce, the lanthanide other than Ce, the additive metal element, and the other metal element. When the content of the salt of the other metal element exceeds the upper limit, the dissociation of $N_2$ on Ru is inhibited, and the ammonia synthesis activity tends to decrease.

Next, in the carrier preparation process, a composite oxide carrier in which the additive metal element is solid-solutionized in a composite oxide containing Ce and a lanthanide other than Ce is formed using the composite oxide precursor solution prepared as described above by a polymerized complex method. Specifically, oxycarboxylic acid or phosphoric acid is added to and dissolved in the composite oxide precursor solution, and additionally, glycol or glycerin is added and mixed. Thereby, a composite metal complex containing Ce, the lanthanide other than Ce, and the additive metal element is formed.

Examples of oxycarboxylic acids include citric acid, malic acid, and lactic acid. The amount of such oxycarboxylic acid or phosphoric acid added is preferably 0.1 equivalents to 50 equivalents, more preferably 1 equivalent to 20 equivalents, and particularly preferably 2 equivalents to 20 equivalents with respect to a total amount of Ce, the lanthanide other than Ce, and the additive metal element. When the amount of oxycarboxylic acid or phosphoric acid added is less than the lower limit or exceeds the upper limit, a composite metal complex containing Ce, the lanthanide other than Ce, and the additive metal element is not sufficiently formed, and a uniform composite oxide carrier tends not to be obtained.

In addition, examples of glycols include ethylene glycol, propylene glycol, and diethylene glycol. The amount of such glycol or glycerin added is preferably 0.01 equivalents to 50 equivalents, more preferably 0.05 equivalents to 20 equivalents, and particularly preferably 0.1 equivalents to 10 equivalents with respect to a total amount of Ce, the lanthanide other than Ce, and the additive metal element. When the amount of glycol or glycerin added is less than the lower limit or exceeds the upper limit, a composite metal complex containing Ce, the lanthanide other than Ce, and the additive metal element is not sufficiently formed, and a uniform composite oxide carrier tends not to be obtained.

Next, when an aqueous solution containing the composite metal complex obtained in this manner is heated, a dehydration ester reaction proceeds in a chain reaction between a carboxyl group of oxycarboxylic acid and a hydroxy group of glycol to produce a polyester polymer gel. In the polyester polymer gel obtained in this manner, since Ce, the lanthanide other than Ce, and the additive metal element are uniformly dispersed, the polyester polymer gel is fired as described below, and thus a composite oxide carrier in which Ce, the lanthanide other than Ce, and the additive metal element are uniformly dispersed is obtained.

The heating temperature of the composite metal complex aqueous solution is preferably 50° C. to 380° C., more preferably 80° C. to 350° C., and particularly preferably 100° C. to 300° C. When the heating temperature of the composite metal complex aqueous solution is less than the lower limit, since a dehydration ester reaction does not proceed, and a polyester polymer gel is not sufficiently produced, it tends to be difficult to obtain a uniform composite oxide carrier, and on the other hand, when the heating temperature exceeds the upper limit, since carbonization of organic substances proceeds in a firing process of the polyester polymer gel to be described below without sufficiently producing a polyester polymer gel, a uniform composite oxide carrier tends not to be obtained.

In addition, the heating time of the composite metal complex aqueous solution is preferably 30 minutes or longer, more preferably 60 minutes or longer, and particularly preferably 120 minutes or longer. When the heating time of the composite metal complex aqueous solution is less than the lower limit, since a polyester polymer gel is not sufficiently produced, a uniform composite oxide carrier tends not to be obtained. Here, the upper limit of the heating time of the composite metal complex aqueous solution is not particularly limited, although it may lead to a long process time.

Next, the polyester polymer gel obtained in this manner is fired in an oxidizing atmosphere (for example, in the atmosphere) or an inert gas atmosphere (for example, in a nitrogen or argon atmosphere), and thus organic substances are carbonized to obtain a composite oxide precursor powder.

The firing temperature of the polyester polymer gel is preferably 400° C. to 600° C., more preferably 425° C. to 575° C., and particularly preferably 450° C. to 550° C. When the firing temperature of the polyester polymer gel is less than the lower limit, since carbonization of organic substances does not sufficiently proceed, a uniform composite oxide carrier tends not to be obtained, and on the other hand, when the firing temperature exceeds the upper limit, since separation of carbon components proceeds in a firing process of the composite oxide precursor powder to be described below without sufficiently carbonizing organic substances, a uniform composite oxide carrier tends not to be obtained.

In addition, the firing time of the polyester polymer gel is preferably 30 minutes or longer, more preferably 60 minutes or longer, and particularly preferably 120 minutes or longer. When the firing time of the polyester polymer gel is less than the lower limit, since carbonization of organic substances does not sufficiently proceed, a uniform composite oxide carrier tends not to be obtained. Here, the upper limit of the firing time of the polyester polymer gel is not particularly limited, although it may lead to a long process time.

Next, when the composite oxide precursor powder obtained in this manner is fired in an oxidizing atmosphere (for example, in the atmosphere) or an inert gas atmosphere (for example, in a nitrogen or argon atmosphere), carbon components are separated, and a composite oxide carrier in which the additive metal element is solid-solutionized in a composite oxide containing Ce and a lanthanide other than Ce is obtained.

The firing temperature of the composite oxide precursor powder is preferably 610° C. to 900° C., more preferably 625° C. to 800° C., and particularly preferably 650° C. to 750° C. When the firing temperature of the composite oxide precursor powder is less than the lower limit, since separation of carbon components does not sufficiently proceed, in the obtained ammonia synthesis catalyst, the ammonia synthesis activity tends to decrease, and on the other hand, when the firing temperature exceeds the upper limit, since a specific surface area of the composite oxide carrier becomes small, in the obtained ammonia synthesis catalyst, the ammonia synthesis activity tends to decrease.

In addition, the firing time of the composite oxide precursor powder is preferably 1 hour to 48 hours, more preferably 2 hours to 36 hours, and particularly preferably 3 hours to 24 hours. When the firing time of the composite oxide precursor powder is less than the lower limit, since separation of carbon components does not sufficiently proceed, in the obtained ammonia synthesis catalyst, the ammonia synthesis activity tends to decrease, and on the other hand, when the firing time exceeds the upper limit, since a specific surface area of the composite oxide carrier becomes small, in the obtained ammonia synthesis catalyst, the ammonia synthesis activity tends to decrease.

[Ruthenium Support Process]

Next, ruthenium (Ru) is supported on the composite oxide carrier obtained in this manner to obtain an ammonia synthesis catalyst. Specifically, first, a Ru precursor is attached to the composite oxide carrier using a solution containing a salt of Ru.

The salt of Ru is not particularly limited, and examples thereof include acetates, carbonates, nitrates, ammonium salts, citrates, dinitrodiammine salts, chlorides, and various complexes (for example, tetraammine complex, carbonyl complex) of Ru. Among these salts of Ru, dodecacarbonyl triruthenium $[Ru_3(CO)_{12}]$, ruthenium acetylacetonate, ruthenium nitrosyl nitrate, and ruthenium nitrate are preferable. In addition, the solvent used in a solution containing a salt of Ru is not particularly limited as long as a salt of Ru is dissolved and Ru ions are produced, and examples thereof include tetrahydrofuran (THF), water, and alcohols. Here, the concentration of the salt of Ru in the solution containing a salt of Ru can be appropriately set according to the amount of Ru supported.

A method of attaching a Ru precursor to the composite oxide carrier is not particularly limited, and examples thereof include a method in which the composite oxide carrier is immersed in a solution containing a salt of Ru and the composite oxide carrier is impregnated with the salt of Ru (impregnation method) and a method in which the solution containing a salt of Ru is adsorbed to the composite oxide carrier (adsorption method).

In addition, in the ruthenium supporting process, it is desirable to attach the Ru precursor to the composite oxide carrier so that the amount of Ru supported with respect to 100 parts by mass of the composite oxide carrier is preferably 0.5 parts by mass to 10 parts by mass, and more preferably 1 part by mass to 5 parts by mass. When an amount of the Ru precursor at which the amount of Ru supported is less than the lower limit is attached, in the obtained ammonia synthesis catalyst, the ammonia synthesis activity tends to decrease, and on the other hand, when the amount exceeds the upper limit, since Ru sintering is likely to occur in some usage environments of the obtained ammonia synthesis catalyst, the degree of dispersion of Ru, which is an active site, is lowered, it is difficult to obtain an effect corresponding to the amount of Ru supported, which tends to be advantageous in terms of costs and the like.

Next, the composite oxide carrier to which the Ru precursor is attached in this manner is dried, and then fired in a reducing gas atmosphere or an inert gas atmosphere, and thus an ammonia synthesis catalyst in which Ru is supported on a composite oxide carrier in which the additive metal element is solid-solutionized in a composite oxide containing Ce and a lanthanide other than Ce is obtained. In particular, since firing is performed in in a reducing gas atmosphere or an inert gas atmosphere (preferably, in a reducing gas atmosphere), Ru in a metal state is supported on the composite oxide carrier, and an ammonia synthesis catalyst having excellent ammonia synthesis activity is obtained.

The drying temperature of the composite oxide carrier is preferably 50° C. to 150° C., and more preferably 75° C. to 125° C. In addition, the drying time is preferably 3 hours or longer, and more preferably 12 hours or longer.

The reducing gas atmosphere is an atmosphere containing a reducing gas such as hydrogen gas, carbon monoxide gas, and hydrocarbon gas, and examples thereof include a mixed gas atmosphere containing the reducing gas and an inert gas (a nitrogen gas, an argon gas, and the like). The concentration of the reducing gas in such a mixed gas atmosphere is preferably 1 vol % to 30 vol %, and more preferably 5 vol % to 20 vol %. In addition, examples of inert gas atmospheres include a nitrogen gas atmosphere, an argon gas atmosphere, and a helium gas atmosphere.

The firing temperature of the composite oxide carrier after drying is preferably 200° C. to 500° C., and more preferably 300° C. to 500° C. In addition, the firing time is preferably 0.5 hours to 10 hours, and more preferably 1 hour to 5 hours. When the firing temperature or the firing time is less than the lower limit, all Ru in a metal state cannot be sufficiently reduced, and Ru tends to remain in the precursor state, and on the other hand, when the firing temperature or the firing time exceeds the upper limit, Ru is sintered, and it is difficult to support the composite oxide carrier in a state in which Ru in a metal state is sufficiently dispersed, and the activity of the obtained ammonia synthesis catalyst tends to decrease.

In the method of producing an ammonia synthesis catalyst of the present disclosure, the ammonia synthesis catalyst produced in this manner may be molded into various forms by a known method. For example, the catalyst may be molded into a pellet form or may be coated on various substrates such as a monolith-like substrate, a pellet-like substrate, and a plate-like substrate.

[Method of Synthesizing Ammonia]

Next, a method of synthesizing ammonia of the present disclosure will be described. The method of synthesizing ammonia of the present disclosure is a method of synthesizing ammonia by bringing a mixed gas containing hydrogen and nitrogen into contact with the ammonia synthesis catalyst of the present disclosure. The method of bringing a mixed gas containing hydrogen and nitrogen into contact with the ammonia synthesis catalyst is not particularly limited, and a method based on a known method of synthesizing ammonia can be used without change.

In the method of synthesizing ammonia of the present disclosure, synthesis conditions are not particularly limited, and conditions known in the method of synthesizing ammonia can be used without change, and for example, a molar ratio ($H_2/N_2$) of hydrogen and nitrogen is preferably 0.1/1 to 5/1, and more preferably 0.5/1 to 3/1. In addition, the mixed gas containing hydrogen and nitrogen may contain an inert gas (argon gas, and the like) as a carrier gas, but a gas containing only hydrogen and nitrogen is preferable in consideration of ammonia production efficiency.

In addition, the reaction temperature is preferably 300° C. to 500° C., and more preferably 350° C. to 450° C. In addition, the reaction pressure is preferably 0.1 MPa to 10 MPa, and more preferably 1 MPa to 8 MPa.

Hereinafter, the present disclosure will be described in more detail with reference to examples and comparative examples, but the present disclosure is not limited to the following examples.

Example 1

<Preparation of Composite Oxide Carrier>

First, titanium tetraisopropoxide [Ti[(CH$_3$)$_2$CHO]$_4$] was hydrolyzed, the obtained precipitate was washed three times with distilled water to obtain titanium oxyhydroxide [TiO(OH)$_2$]. The titanium oxyhydroxide was dissolved in a nitric acid aqueous solution to prepare a 7 M titanium oxynitride [TiO(NO$_3$)$_2$] aqueous solution. In addition, cerium nitrate-hexahydrate [Ce(NO$_3$)$_3$.6H$_2$O] and lanthanum nitrate hexahydrate [La(NO$_3$)$_3$.6H$_2$O] in amounts in which a molar ratio of cerium, lanthanum and titanium in the titanium oxynitride aqueous solution was Ce:La:Ti=0.5:0.475:0.025 were dissolved in a minimum amount of deionized water to prepare an aqueous solution in which cerium nitrate and lanthanum nitrate were dissolved. Here, the "minimum amount" of deionized water is a minimum amount of deionized water in which predetermined amounts of cerium nitratehexahydrate and lanthanum nitrate hexahydrate can be completely dissolved (the same applies to the following examples and comparative examples).

Next, the aqueous solution in which cerium nitrate and lanthanum nitrate were dissolved was added to the titanium oxynitride aqueous solution and stirred. 6 equivalents of citric acid with respect to a total amount of cerium, lanthanum and titanium was added to and dissolved in the obtained aqueous solution, and 12 equivalents of ethylene glycol with respect to a total amount of cerium, lanthanum and titanium was additionally added, and stirred at 80° C. for 30 minutes to obtain a composite metal oxycarboxylic acid complex aqueous solution containing cerium, lanthanum, and titanium.

Then, the aqueous solution was heated and gelled at 300° C. for 180 minutes, and the obtained polyester polymer gel was fired in the atmosphere at 500° C. for 5 hours to obtain a composite oxide precursor powder. The composite oxide precursor powder was fired in the atmosphere at 700° C. for 5 hours, and a ceria-lanthanum oxide-titania composite oxide carrier in which titanium was solid-solutionized in a ceria-lanthanum oxide composite oxide (composition formula: $Ce_{0.5}La_{0.475}Ti_{0.025}O_{1.7625}$) was obtained.

<Preparation of Catalyst>

A predetermined amount of the ceria-lanthanum oxide-titania composite oxide carrier (composition formula: $Ce_{0.5}La_{0.475}Ti_{0.025}O_{1.7625}$) was added to a solution in which a predetermined amount of dodecacarbonyl triruthenium [Ru$_3$(CO)$_{12}$] was dissolved in tetrahydrofuran (THF) and stirred for 5 hours so that the amount of ruthenium supported with respect to 100 parts by mass of the composite oxide carrier was 3 parts by mass. THF was removed under a reduced pressure from the obtained dispersion using a rotatory evaporator, and the obtained powder was then dried at 80° C. for 18 hours. The dried powder was fired under a 100% N$_2$ flow at 300° C. for 5 hours, and additionally fired at 500° C. for 2 hours to obtain an ammonia synthesis catalyst in which ruthenium was supported on the ceria-lanthanum oxide-titania composite oxide carrier (Ru/$Ce_{0.5}La_{0.475}Ti_{0.025}O_{1.7625}$, the amount of Ru supported: 3 parts by mass/100 parts by mass-carrier).

Example 2

A ceria-lanthanum oxide-titania composite oxide carrier in which titanium was solid-solutionized in a ceria-lanthanum oxide composite oxide (composition formula: $Ce_{0.5}La_{0.45}Ti_{0.05}O_{1.775}$) was prepared and additionally, an ammonia synthesis catalyst in which ruthenium was supported on the ceria-lanthanum oxide-titania composite oxide carrier (Ru/$Ce_{0.5}La_{0.45}Ti_{0.05}O_{1.775}$, the amount of Ru supported: 3 parts by mass/100 parts by mass-carrier) was obtained in the same manner as in Example 1 except that an aqueous solution in which cerium nitrate and lanthanum nitrate were dissolved was prepared using cerium nitrate-hexahydrate and lanthanum nitrate hexahydrate in amounts in which a molar ratio of cerium, lanthanum and titanium in the titanium oxynitride aqueous solution was Ce:La:Ti=0.5:0.45:0.05.

Example 3

A ceria-lanthanum oxide-titania composite oxide carrier in which titanium was solid-solutionized in a ceria-lanthanum oxide composite oxide (composition formula: $Ce_{0.5}La_{0.425}Ti_{0.075}O_{1.7875}$) was prepared, and additionally, an ammonia synthesis catalyst in which ruthenium was supported on the ceria-lanthanum oxide-titania composite oxide carrier (Ru/$Ce_{0.5}La_{0.425}Ti_{0.075}O_{1.7875}$, the amount of Ru supported: 3 parts by mass/100 parts by mass-carrier) was obtained in the same manner as in Example 1 except that an aqueous solution in which cerium nitrate and lanthanum nitrate were dissolved was prepared using cerium nitratehexahydrate and lanthanum nitrate hexahydrate in amounts in which a molar ratio of cerium, lanthanum and titanium in the titanium oxynitride aqueous solution was Ce:La:Ti=0.5:0.425:0.075.

Example 4

A ceria-lanthanum oxide-titania composite oxide carrier in which titanium was solid-solutionized in a ceria-lanthanum oxide composite oxide (composition formula: $Ce_{0.5}La_{0.4}Ti_{0.1}O_{1.8}$) was prepared, and additionally, an ammonia synthesis catalyst in which ruthenium was supported on the ceria-lanthanum oxide-titania composite oxide carrier ($Ru/Ce_{0.5}La_{0.4}Ti_{0.1}O_{1.8}$, the amount of Ru supported: 3 parts by mass/100 parts by mass-carrier) was obtained in the same manner as in Example 1 except that an aqueous solution in which cerium nitrate and lanthanum nitrate were dissolved was prepared using cerium nitratehexahydrate and lanthanum nitrate hexahydrate in amounts in which a molar ratio of cerium, lanthanum and titanium in the titanium oxynitride aqueous solution was Ce:La:Ti=0.5:0.4:0.1.

Example 5

A ceria-lanthanum oxide-titania composite oxide carrier in which titanium was solid-solutionized in a ceria-lanthanum oxide composite oxide (composition formula: $Ce_{0.5}La_{0.375}Ti_{0.125}O_{1.8125}$) was prepared, and additionally, an ammonia synthesis catalyst in which ruthenium was supported on the ceria-lanthanum oxide-titania composite oxide carrier ($Ru/Ce_{0.5}La_{0.375}Ti_{0.125}O_{1.8125}$, the amount of Ru supported: 3 parts by mass/100 parts by mass-carrier) was obtained in the same manner as in Example 1 except that an aqueous solution in which cerium nitrate and lanthanum nitrate were dissolved was prepared using cerium nitratehexahydrate and lanthanum nitrate hexahydrate in amounts in which a molar ratio of cerium, lanthanum and titanium in the titanium oxynitride aqueous solution was Ce:La:Ti=0.5:0.375:0.125.

Example 6

A ceria-lanthanum oxide-titania composite oxide carrier in which titanium was solid-solutionized in a ceria-lanthanum oxide composite oxide (composition formula: $Ce_{0.5}La_{0.25}Ti_{0.25}O_{1.875}$) was prepared, and additionally, an ammonia synthesis catalyst in which ruthenium was supported on the ceria-lanthanum oxide-titania composite oxide carrier ($Ru/Ce_{0.5}La_{0.25}Ti_{0.25}O_{1.875}$, the amount of Ru supported: 3 parts by mass/100 parts by mass-carrier) was obtained in the same manner as in Example 1 except that an aqueous solution in which cerium nitrate and lanthanum nitrate were dissolved was prepared using cerium nitratehexahydrate and lanthanum nitrate hexahydrate in amounts in which a molar ratio of cerium, lanthanum and titanium in the titanium oxynitride aqueous solution was Ce:La:Ti=0.5:0.25:0.25.

Example 7

A ceria-lanthanum oxide-zirconia composite oxide carrier in which zirconium was solid-solutionized in a ceria-lanthanum oxide composite oxide (composition formula: $Ce_{0.5}La_{0.4}Zr_{0.1}O_{1.8}$) was prepared, and additionally, an ammonia synthesis catalyst in which ruthenium was supported on the ceria-lanthanum oxide-zirconia composite oxide carrier ($Ru/Ce_{0.5}La_{0.4}Zr_{0.1}O_{1.8}$, the amount of Ru supported: 3 parts by mass/100 parts by mass-carrier) was obtained in the same manner as in Example 1 except that a zirconium oxynitride aqueous solution prepared by dissolving zirconium oxynitrate dehydrate [$ZrO(NO_3)_2 \cdot 2H_2O$] in deionized water was used in place of the titanium oxynitride aqueous solution, and an aqueous solution in which cerium nitrate and lanthanum nitrate were dissolved was prepared using cerium nitratehexahydrate and lanthanum nitrate hexahydrate in amounts in which a molar ratio of cerium, lanthanum and zirconium in the zirconium oxynitride aqueous solution was Ce:La:Zr=0.5:0.4:0.1.

Example 8

A ceria-lanthanum oxide-alumina composite oxide carrier in which aluminum was solid-solutionized in a ceria-lanthanum oxide composite oxide (composition formula: $Ce_{0.5}La_{0.4}Al_{0.1}O_{1.8}$) was prepared, and additionally, an ammonia synthesis catalyst in which ruthenium was supported on the ceria-lanthanum oxide-alumina composite oxide carrier ($Ru/Ce_{0.5}La_{0.4}Al_{0.1}O_{1.8}$, the amount of Ru supported: 3 parts by mass/100 parts by mass-carrier) was obtained in the same manner as in Example 1 except that an aluminum nitrate aqueous solution prepared by dissolving aluminum nitrate nonahydrate [$Al(NO_3)_3 \cdot 9H_2O$] in deionized water was used in place of the titanium oxynitride aqueous solution, and an aqueous solution in which cerium nitrate and lanthanum nitrate were dissolved was prepared using cerium nitratehexahydrate and lanthanum nitrate hexahydrate in amounts in which a molar ratio of cerium, lanthanum and aluminum in the aluminum nitrate aqueous solution was Ce:La:Al=0.5:0.4:0.1.

Example 9

<Preparation of Composite Oxide Carrier>

A ceria-praseodymium oxide-titania composite oxide carrier in which titanium was solid-solutionized in a ceria-praseodymium oxide composite oxide (composition formula: $Ce_{0.5}Pr_{0.45}Ti_{0.05}O_2$) was prepared in the same manner as in Example 1 except that, in place of the aqueous solution in which cerium nitrate and lanthanum nitrate were dissolved, an aqueous solution in which cerium nitrate and praseodymium nitrate were dissolved using cerium nitratehexahydrate and praseodymium nitrate hexahydrate [$Pr(NO_3)_3 \cdot 6H_2O$] in amounts in which a molar ratio of cerium, praseodymium and titanium in the titanium oxynitride aqueous solution was Ce:Pr:Ti=0.5:0.45:0.05 was prepared, and the firing time of the composite oxide precursor powder in the atmosphere at 700° C. was changed to 20 hours. Here, in the composition formula, praseodymium was determined as a tetravalent element.

<Preparation of Catalyst>

A predetermined amount of the ceria-praseodymium oxide-titania composite oxide carrier (composition formula: $Ce_{0.5}Pr_{0.45}Ti_{0.05}O_2$) was added to a solution in which a predetermined amount of dodecacarbonyl triruthenium [$Ru_3(CO)_{12}$] was dissolved in tetrahydrofuran (THF) and stirred for 5 hours so that the amount of ruthenium supported was 3 parts by mass with respect to 100 parts by mass of the composite oxide carrier. THF was removed under a reduced pressure from the obtained dispersion using a rotatory evaporator, and the obtained powder was then dried at 80° C. for 12 hours. The dried powder was fired under a 4% $H_2$/96% $N_2$ flow at 300° C. for 1 hour to obtain an ammonia synthesis catalyst in which ruthenium was supported on the ceria-praseodymium oxide-titania composite oxide carrier ($Ru/Ce_{0.5}Pr_{0.45}Ti_{0.05}O_2$, the amount of Ru supported: 3 parts by mass/100 parts by mass-carrier). Here, in the composition formula, praseodymium was determined as a tetravalent element.

Example 10

A ceria-praseodymium oxide-titania composite oxide carrier in which titanium was solid-solutionized in a ceria-praseodymium oxide composite oxide (composition formula: $Ce_{0.5}Pr_{0.4}Ti_{0.1}O_2$) was prepared, and additionally, an ammonia synthesis catalyst in which ruthenium was supported on the ceria-praseodymium oxide-titania composite oxide carrier ($Ru/Ce_{0.5}Pr_{0.4}Ti_{0.1}O_2$, the amount of Ru supported: 3 parts by mass/100 parts by mass-carrier) was obtained in the same manner as in Example 9 except that an aqueous solution in which cerium nitrate and praseodymium nitrate were dissolved was prepared using cerium nitratehexahydrate and praseodymium nitrate hexahydrate in amounts in which a molar ratio of cerium, praseodymium and titanium in the titanium oxynitride aqueous solution was Ce:Pr:Ti=0.5:0.4:0.1. Here, in the composition formula, praseodymium was determined as a tetravalent element.

Example 11

A ceria-praseodymium oxide-titania composite oxide carrier in which titanium was solid-solutionized in a ceria-praseodymium oxide composite oxide (composition formula: $Ce_{0.5}Pr_{0.3}Ti_{0.2}O_2$) was prepared, and additionally, an ammonia synthesis catalyst in which ruthenium was supported on the ceria-praseodymium oxide-titania composite oxide carrier ($Ru/Ce_{0.5}Pr_{0.3}Ti_{0.2}O_2$, the amount of Ru supported: 3 parts by mass/100 parts by mass-carrier) was obtained in the same manner as in Example 9 except that an aqueous solution in which cerium nitrate and praseodymium nitrate were dissolved was prepared using cerium nitratehexahydrate and praseodymium nitrate hexahydrate in amounts in which a molar ratio of cerium, praseodymium and titanium in the titanium oxynitride aqueous solution was Ce:Pr:Ti=0.5:0.3:0.2. Here, in the composition formula, praseodymium was determined as a tetravalent element.

Example 12

A ceria-praseodymium oxide-alumina composite oxide carrier in which aluminum was solid-solutionized in a ceria-praseodymium oxide composite oxide (composition formula: $Ce_{0.5}Pr_{0.4}Al_{0.1}O_{1.95}$) was prepared, and additionally, an ammonia synthesis catalyst in which ruthenium was supported on the ceria-praseodymium oxide-alumina composite oxide carrier ($Ru/Ce_{0.5}Pr_{0.4}Al_{0.1}O_{1.95}$, the amount of Ru supported: 3 parts by mass/100 parts by mass-carrier) was obtained in the same manner as in Example 9 except that, in place of the titanium oxynitride aqueous solution, an aluminum nitrate aqueous solution prepared by dissolving aluminum nitrate nonahydrate [$Al(NO_3)_3 \cdot 9H_2O$] in deionized water was used, and an aqueous solution in which cerium nitrate and praseodymium nitrate were dissolved was prepared using cerium nitratehexahydrate and praseodymium nitrate hexahydrate [$Pr(NO_3)_3 \cdot 6H_2O$] in amounts in which a molar ratio of cerium, praseodymium, and aluminum in the aluminum nitrate aqueous solution was Ce:Pr:Al=0.5:0.4:0.1. Here, in the composition formula, praseodymium was determined as a tetravalent element.

Example 13

<Preparation of Composite Oxide Carrier>

A ceria-lanthanum oxide-silica composite oxide carrier in which silicon was solid-solutionized in a ceria-lanthanum oxide composite oxide (composition formula: $Ce_{0.5}La_{0.45}Si_{0.05}O_{1.775}$) was prepared in the same manner as in Example 1 except that, in place of the titanium oxynitride aqueous solution, a TEOS solution prepared by adding nitric acid to a mixture solution containing tetraethoxysilane (TEOS) and ethylene glycol and performing mixing at 80° C. was used, an aqueous solution in which cerium nitrate and lanthanum nitrate were dissolved was prepared using cerium nitratehexahydrate and lanthanum nitrate hexahydrate in amounts in which a molar ratio of cerium, lanthanum and silicon in the TEOS solution was Ce:La:Si=0.5:0.45:0.05, and the firing time of the composite oxide precursor powder in the atmosphere at 700° C. was changed to 20 hours.

<Preparation of Catalyst>

An ammonia synthesis catalyst in which ruthenium was supported on the ceria-lanthanum oxide-silica composite oxide carrier ($Ru/Ce_{0.5}La_{0.45}Si_{0.05}O_{1.775}$, the amount of Ru supported: 3 parts by mass/100 parts by mass-carrier) was obtained in the same manner as in Example 9 except that the ceria-lanthanum oxide-silica composite oxide carrier (composition formula: $Ce_{0.5}La_{0.45}Si_{0.05}O_{1.775}$) was used in place of the ceria-praseodymium oxide-titania composite oxide carrier (composition formula: $Ce_{0.5}Pr_{0.45}Ti_{0.05}O_2$).

Example 14

A ceria-lanthanum oxide-silica composite oxide carrier in which silica was solid-solutionized in a ceria-lanthanum oxide composite oxide (composition formula: $Ce_{0.5}La_{0.4}Si_{0.1}O_{1.8}$) was prepared, and additionally, an ammonia synthesis catalyst in which ruthenium was supported on the ceria-lanthanum oxide-silica composite oxide carrier ($Ru/Ce_{0.5}La_{0.4}Si_{0.1}O_{1.8}$, the amount of Ru supported: 3 parts by mass/100 parts by mass-carrier) was obtained in the same manner as in Example 13 except that an aqueous solution in which cerium nitrate and lanthanum nitrate were dissolved was prepared using cerium nitratehexahydrate and lanthanum nitrate hexahydrate in amounts in which a molar ratio of cerium, lanthanum and silicon in the TEOS solution was Ce:La:Si=0.5:0.4:0.1.

Example 15

A ceria-lanthanum oxide-silica composite oxide carrier in which silica was solid-solutionized in a ceria-lanthanum oxide composite oxide (composition formula: $Ce_{0.5}La_{0.3}Si_{0.2}O_{1.85}$) was prepared, and additionally, an ammonia synthesis catalyst in which ruthenium was supported on the ceria-lanthanum oxide-silica composite oxide carrier ($Ru/Ce_{0.5}La_{0.3}Si_{0.2}O_{1.85}$, the amount of Ru supported: 3 parts by mass/100 parts by mass-carrier) was obtained in the same manner as in Example 13 except that an aqueous solution in which cerium nitrate and lanthanum nitrate were dissolved was prepared using cerium nitratehexahydrate and lanthanum nitrate hexahydrate in amounts in which a molar ratio of cerium, lanthanum and silicon in the TEOS solution was Ce:La:Si=0.5:0.3:0.2.

Example 16

A ceria-lanthanum oxide-silica composite oxide carrier in which silica was solid-solutionized in a ceria-lanthanum oxide composite oxide (composition formula: $Ce_{0.5}La_{0.2}Si_{0.3}O_{1.9}$) was prepared, and additionally, an ammonia synthesis catalyst in which ruthenium was supported on the ceria-lanthanum oxide-silica composite oxide carrier ($Ru/Ce_{0.5}La_{0.2}Si_{0.3}O_{1.9}$, the amount of Ru supported: 3 parts by mass/100 parts by mass-carrier) was obtained in the same manner as in Example 13 except that an aqueous solution in which cerium nitrate and lanthanum nitrate were dissolved was prepared using cerium nitratehexahydrate and lanthanum nitrate hexahydrate in amounts in which a molar ratio of cerium, lanthanum and silicon in the TEOS solution was Ce:La:Si=0.5:0.2:0.3.

Example 17

A ceria-praseodymium oxide-silica composite oxide carrier in which silicon was solid-solutionized in a ceria-praseodymium oxide composite oxide (composition formula: $Ce_{0.5}Pr_{0.4}Si_{0.1}O_2$) was prepared, and additionally, an ammonia synthesis catalyst in which ruthenium was supported on the ceria-praseodymium oxide-silica composite oxide carrier ($Ru/Ce_{0.5}Pr_{0.4}Si_{0.1}O_2$, the amount of Ru supported: 3 parts by mass/100 parts by mass-carrier) was obtained in the same manner as in Example 13 except that, in place of the titanium oxynitride aqueous solution, a TEOS solution prepared by adding nitric acid to a mixture solution containing tetraethoxysilane (TEOS) and ethylene glycol and performing mixing at 80° C. was used, and an aqueous solution in which cerium nitrate and praseodymium nitrate were dissolved was prepared using cerium nitratehydrate and praseodymium nitrate hexahydrate [$Pr(NO_3)_3 \cdot 6H_2O$] in amounts in which a molar ratio of cerium, praseodymium and silicon in the TEOS solution was Ce:Pr:Si=0.5:0.4:0.1. Here, in the composition formula, praseodymium was determined as a tetravalent element.

Comparative Example 1

A ceria-lanthanum oxide composite oxide carrier (composition formula: $Ce_{0.5}La_{0.5}O_{1.75}$) was prepared, and additionally, an ammonia synthesis catalyst in which ruthenium was supported on the ceria-lanthanum oxide composite oxide carrier ($Ru/Ce_{0.5}La_{0.5}O_{1.75}$, the amount of Ru supported: 3 parts by mass/100 parts by mass-carrier) was obtained in the same manner as in Example 1 except that an aqueous solution in which cerium nitrate and lanthanum nitrate were dissolved was prepared using cerium nitratehexahydrate and lanthanum nitrate hexahydrate in amounts in which a molar ratio of cerium and lanthanum was Ce:La=0.5:0.5, and the titanium oxynitride aqueous solution was not used.

Comparative Example 2

A ceria-lanthanum oxide-titania composite oxide carrier in which titanium was solid-solutionized in a ceria-lanthanum oxide composite oxide (composition formula: $Ce_{0.5}La_{0.125}Ti_{0.375}O_{1.9375}$) was prepared, and additionally, an ammonia synthesis catalyst in which ruthenium was supported on the ceria-lanthanum oxide-titania composite oxide carrier ($Ru/Ce_{0.5}La_{0.125}Ti_{0.375}O_{1.9375}$, the amount of Ru supported: 3 parts by mass/100 parts by mass-carrier) was obtained in the same manner as in Example 1 except that an aqueous solution in which cerium nitrate and lanthanum nitrate were dissolved was prepared using cerium nitratehexahydrate and lanthanum nitrate hexahydrate in amounts in which a molar ratio of cerium, lanthanum and titanium in the titanium oxynitride aqueous solution was Ce:La:Ti=0.5:0.125:0.375.

Comparative Example 3

A ceria-titania composite oxide carrier in which titanium was solid-solutionized in ceria (composition formula: $Ce_{0.5}Ti_{0.5}O_2$) was prepared, and additionally, an ammonia synthesis catalyst in which ruthenium was supported on the ceria-titania composite oxide carrier ($Ru/Ce_{0.5}Ti_{0.5}O_2$, the amount of Ru supported: 3 parts by mass/100 parts by mass-carrier) was obtained in the same manner as in Example 1 except that an aqueous solution in which cerium nitrate was dissolved was prepared using cerium nitratehexahydrate in amounts in which a molar ratio of cerium and titanium in the titanium oxynitride aqueous solution was Ce:Ti=0.5:0.5 without using lanthanum nitrate hexahydrate.

Comparative Example 4

<Preparation of Composite Oxide Carrier>
First, a ceria-lanthanum oxide composite oxide (composition formula: $Ce_{0.5}La_{0.4}O_{1.6}$) was obtained in the same manner as in Example 1 except that an aqueous solution in which cerium nitrate and lanthanum nitrate were dissolved was prepared using cerium nitratehexahydrate and lanthanum nitrate hexahydrate in amounts in which a molar ratio of cerium and lanthanum was Ce:La=0.5:0.4, and the titanium oxynitride aqueous solution was not used.

Next, the ceria-lanthanum oxide composite oxide was immersed in a 7 M titanium oxynitride aqueous solution prepared in the same manner as in Example 1 so that a molar ratio of cerium, lanthanum and titanium was Ce:La:Ti=0.5:0.4:0.1, and the titanium oxynitride was impregnated into the ceria-lanthanum oxide composite oxide. Then, the obtained dispersion was heated at 110° C. for 3 hours, water was removed, the obtained powder was additionally dried at 500° C. for 5 hours, and a mixed oxide ($0.1TiO_2$—$Ce_{0.5}La_{0.4}O_{1.6}$) carrier containing titania and the ceria-lanthanum oxide composite oxide was obtained.

<Preparation of Catalyst>
An ammonia synthesis catalyst in which ruthenium was supported on a mixed oxide carrier containing the titania and the ceria-lanthanum oxide composite oxide ($Ru/0.1TiO_2$—$Ce_{0.5}La_{0.4}O_{1.6}$, the amount of Ru supported: 3 parts by mass/100 parts by mass-carrier) was obtained in the same manner as in Example 1 except that a mixed oxide carrier containing the titania and the ceria-lanthanum oxide composite oxide was used in place of the ceria-lanthanum oxide-titania composite oxide carrier.

Comparative Example 5

A titania ($TiO_2$) carrier was prepared in the same manner as in Example 1 except that the aqueous solution in which cerium nitrate and lanthanum nitrate were dissolved was not used, and an ammonia synthesis catalyst in which ruthenium was supported on the titania carrier ($Ru/TiO_2$, the amount of Ru supported: 3 parts by mass/100 parts by mass-carrier) was obtained.

Comparative Example 6

A ceria ($CeO_2$) carrier was prepared in the same manner as in Example 1 except that no lanthanum nitrate hexahydrate was used, an aqueous solution in which cerium nitrate was dissolved was prepared using cerium nitratehexahydrate, and the titanium oxynitride aqueous solution was not used, and an ammonia synthesis catalyst in which ruthenium was supported on the ceria carrier ($Ru/CeO_2$, the amount of Ru supported: 3 parts by mass/100 parts by mass-carrier) was obtained.

Comparative Example 7

A silica ($SiO_2$) carrier was prepared in the same manner as in Example 13 except that the aqueous solution in which cerium nitrate and lanthanum nitrate were dissolved was not used, and an ammonia synthesis catalyst in which ruthenium was supported on the silica carrier (Ru/SiO$_2$, the amount of Ru supported: 3 parts by mass/100 parts by mass-carrier) was obtained.

[Ammonia Synthesis Reaction]

0.2 g of the obtained ammonia synthesis catalyst was filled into a reaction tube, and this was installed in a fixed bed flow type reactor. While a mixed gas containing hydrogen and nitrogen (75 vol % H$_2$/25 vol % H$_2$) was supplied to the ammonia synthesis catalyst at a flow rate of 80 ml/min and a pressure of 0.1 MPa, first, the ammonia synthesis catalyst was heated at 600° C. for 30 minutes to perform a pretreatment, and heating was then performed at 400° C. or 350° C., and an ammonia synthesis reaction was caused. 1 hour after the synthesis reaction started, an ammonia concentration of a catalyst exhaust gas was measured using an infrared spectroscopic device installed at an outlet of the reactor, and the ammonia synthesis rate per 1 g of the catalyst was determined. The results are shown in Table 1 and FIG. 1 and FIG. 2. In addition, the ammonia synthesis rates of the ammonia synthesis catalysts obtained in Examples 1 to 6 and Comparative Examples 1 to 3 with respect to the molar fraction of titanium in the catalyst were plotted. The results are shown in FIG. 3.

TABLE 1

| | Molar ratio | | | | | | | Ammonia synthesis rate [mmol/(g · h)] | |
|---|---|---|---|---|---|---|---|---|---|
| | Ce | La | Pr | Ti | Zr | Al | Si | 400° C. | 350° C. |
| Example 1 | 0.5 | 0.48 | 0 | 0.03 | 0 | 0 | 0 | 2.80 | — |
| Example 2 | 0.5 | 0.45 | 0 | 0.05 | 0 | 0 | 0 | 2.67 | — |
| Example 3 | 0.5 | 0.43 | 0 | 0.08 | 0 | 0 | 0 | 3.24 | — |
| Example 4 | 0.5 | 0.4 | 0 | 0.1 | 0 | 0 | 0 | 3.49 | 3.30 |
| Example 5 | 0.5 | 0.38 | 0 | 0.13 | 0 | 0 | 0 | 3.42 | — |
| Example 6 | 0.5 | 0.25 | 0 | 0.25 | 0 | 0 | 0 | 3.24 | — |
| Example 7 | 0.5 | 0.4 | 0 | 0 | 0.1 | 0 | 0 | 3.13 | — |
| Example 8 | 0.5 | 0.4 | 0 | 0 | 0 | 0.1 | 0 | 3.17 | — |
| Example 9 | 0.5 | 0 | 0.45 | 0.05 | 0 | 0 | 0 | 2.95 | — |
| Example 10 | 0.5 | 0 | 0.4 | 0.1 | 0 | 0 | 0 | 3.08 | — |
| Example 11 | 0.5 | 0 | 0.3 | 0.2 | 0 | 0 | 0 | 3.06 | — |
| Example 12 | 0.5 | 0 | 0.4 | 0 | 0 | 0.1 | 0 | 3.22 | — |
| Example 13 | 0.5 | 0.45 | 0 | 0 | 0 | 0 | 0.05 | 3.20 | 3.36 |
| Example 14 | 0.5 | 0.4 | 0 | 0 | 0 | 0 | 0.1 | 3.30 | 3.75 |
| Example 15 | 0.5 | 0.3 | 0 | 0 | 0 | 0 | 0.2 | 2.99 | — |
| Example 16 | 0.5 | 0.2 | 0 | 0 | 0 | 0 | 0.3 | 2.70 | — |
| Example 17 | 0.5 | 0 | 0.4 | 0 | 0 | 0 | 0.1 | 3.28 | 3.56 |
| Comparative Example 1 | 0.5 | 0.5 | 0 | 0 | 0 | 0 | 0 | 2.51 | 1.75 |
| Comparative Example 2 | 0.5 | 0.13 | 0 | 0.38 | 0 | 0 | 0 | 1.96 | — |
| Comparative Example 3 | 0.5 | 0 | 0 | 0.5 | 0 | 0 | 0 | 1.29 | — |
| Comparative Example 4 | 0.5 | 0.4 | 0 | 0.1 | 0 | 0 | 0 | 1.82 | — |
| Comparative Example 5 | 0 | 0 | 0 | 1 | 0 | 0 | 0 | 0.01 | — |
| Comparative Example 6 | 1 | 0 | 0 | 0 | 0 | 0 | 0 | 2.21 | — |
| Comparative Example 7 | 0 | 0 | 0 | 0 | 0 | 0 | 1 | 0.09 | — |

As shown in Table 1 and FIG. 1, the ammonia synthesis catalysts using a composite oxide in which a predetermined amount of titanium was solid-solutionized in a ceria-lanthanum oxide composite oxide as a carrier (Examples 1 to 6) had a higher ammonia synthesis rate than the catalyst using a ceria-lanthanum oxide composite oxide as a carrier (Comparative Example 1), and the catalyst using ceria as a carrier (Comparative Example 6).

On the other hand, the catalyst using a composite oxide in which an amount of titanium larger than a predetermined amount was solid-solutionized in a ceria-lanthanum oxide composite oxide as a carrier (Comparative Example 2) had a lower ammonia synthesis rate than the catalyst using a ceria-lanthanum oxide composite oxide as a carrier (Comparative Example 1), and the catalyst using a composite oxide in which an amount of titanium larger than a predetermined amount was solid-solutionized in ceria as a carrier (Comparative Example 3) had a lower ammonia synthesis rate than the catalyst using ceria as a carrier (Comparative Example 6).

In addition, the catalyst in which titanium was not solid-solutionized in a ceria-lanthanum oxide composite oxide even if a molar ratio of cerium, lanthanum, and titanium was the same (Comparative Example 4) had a lower ammonia synthesis rate than the ammonia synthesis catalyst in which titanium was solid-solutionized (Example 4). This was thought to be because the catalyst in which ruthenium was supported on titanium did not exhibit ammonia synthesis activity as shown in Comparative Example 5.

In addition, as shown in Table 1, FIG. 1 and FIG. 3, it was found that a high ammonia synthesis rate was obtained when the molar fraction of titanium in the ammonia synthesis catalyst was within a predetermined range.

Based on the above results, it was found that the ammonia synthesis activity was exhibited first when titanium was solid-solutionized in the ceria-lanthanum oxide composite oxide. In addition, it was found that the ammonia synthesis rate was improved when a predetermined amount of titanium was solid-solutionized in the ceria-lanthanum oxide composite oxide.

In addition, as shown in Table 1 and FIG. 1, it was found that the ammonia synthesis catalysts using a composite oxide in which a predetermined amount of zirconium (Example 7) or aluminum (Example 8) was solid-solutionized in a ceria-lanthanum oxide composite oxide as a carrier had a higher ammonia synthesis rate than the catalyst using a ceria-lanthanum oxide composite oxide as a carrier (Comparative Example 1), and the ammonia synthesis rate was improved when a predetermined amount of zirconium or aluminum was solid-solutionized in a ceria-lanthanum oxide composite oxide.

In addition, as shown in Table 1 and FIG. 1, it was found that a high ammonia synthesis rate was obtained in the ammonia synthesis catalysts containing praseodymium in place of lanthanum (Examples 9 to 12).

In addition, as shown in Table 1 and FIG. 1, it was found that a high ammonia synthesis rate was obtained in the ammonia synthesis catalysts using a composite oxide in which silicon was solid-solutionized in place of titanium, zirconium, and aluminum as a carrier (Examples 13 to 17).

On the other hand, it was found that the catalyst using silica as a carrier (Comparative Example 7) had a very low ammonia synthesis rate.

Figure 2:
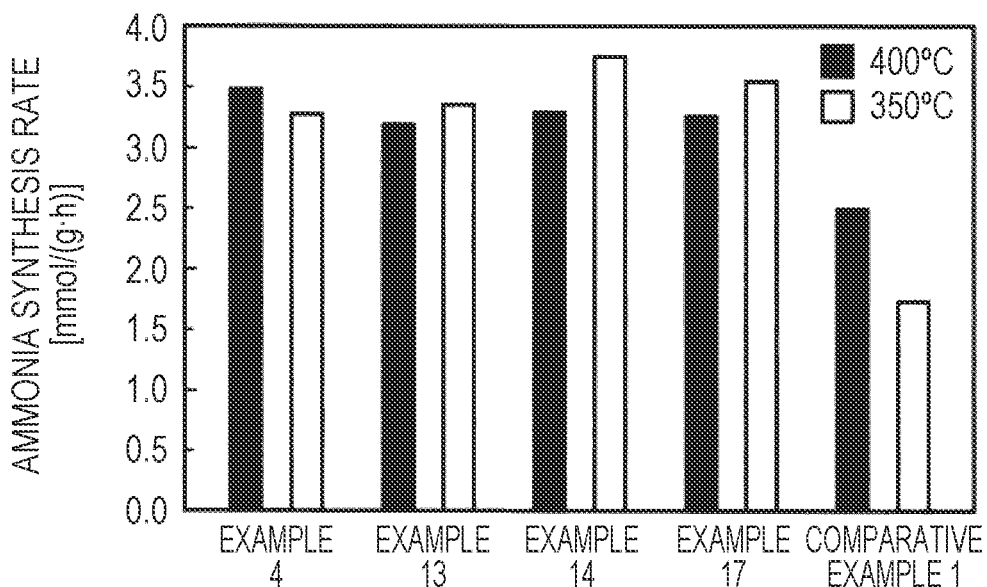
FIG. 2 is a graph showing ammonia synthesis rates of ammonia synthesis catalysts obtained in Examples 4, 13, 14, and 17 and Comparative Example 1 at a reaction temperature of 400° C. and 350° C.
Figure 3:
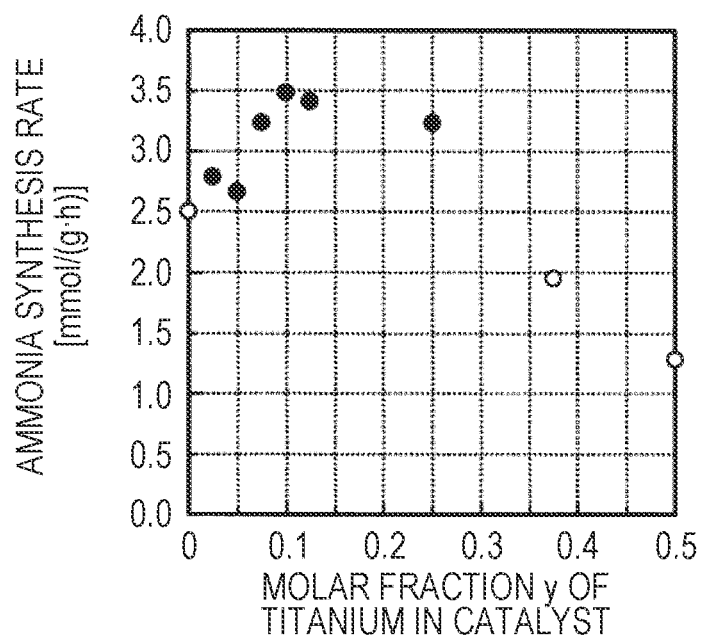
FIG. 3 is a graph showing the results in which ammonia synthesis rates of ammonia synthesis catalysts obtained in Examples 1 to 6 and Comparative Examples 1 to 3 are plotted with respect to a molar fraction of titanium in composite oxide carriers constituting the ammonia synthesis catalysts.

In addition, as shown in Table 1 and FIG. 2, it was found that, in the ammonia synthesis catalyst using a composite oxide in which titanium was solid-solutionized as a carrier (Example 4), a higher ammonia synthesis rate was obtained when the ammonia synthesis reaction temperature was 400° C. than when the ammonia synthesis reaction temperature was 350° C. On the other hand, it was found that, in the ammonia synthesis catalysts using a composite oxide in which silicon was solid-solutionized as a carrier (Examples 13, 14, and 17), a higher ammonia synthesis rate was obtained when the ammonia synthesis reaction temperature was 350° C. than when the ammonia synthesis reaction temperature was 400° C. This was thought to be because the peak of activity was exhibited at a lower temperature when silicon was solid-solutionized than when titanium was solid-solutionized.

In addition, it was found that, in the ammonia synthesis catalyst using a composite oxide in which silicon was solid-solutionized as a carrier (Example 14), even if the ammonia synthesis reaction temperature was 350° C., a higher ammonia synthesis rate was obtained than when the ammonia synthesis reaction was performed at 400° C. using the ammonia synthesis catalyst using a composite oxide in which titanium was solid-solutionized as a carrier (Example 4).

As described above, according to the present disclosure, it is possible to obtain an ammonia synthesis catalyst having excellent ammonia synthesis activity. Therefore, according to the method of synthesizing ammonia of the present disclosure, since it is possible to efficiently synthesize ammonia, the method has high energy efficiency and, for example, is beneficial for producing ammonia used as an energy carrier of hydrogen energy.

What is claimed is:

1. An ammonia synthesis catalyst, comprising:
    a composite oxide carrier in which at least one additive metal element selected from the group consisting of titanium (Ti), zirconium (Zr), hafnium (Hf), aluminum (Al), gallium (Ga), indium (In), silicon (Si), germanium (Ge), and tin (Sn) is solid-solutionized in a composite oxide containing cerium (Ce) and a lanthanide other than Ce and having a composition represented by the following formula:

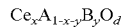

(in the formula, A represents a lanthanide other than Ce, B represents the additive metal element, x represents a molar fraction of Ce, y represents a molar fraction of the additive metal element, 1−x−y represents a molar fraction of a lanthanide other than Ce, x and y satisfy $0.1 \leq x \leq 0.9$, $0.01 \leq y \leq 0.3$, and $0.11 \leq x+y \leq 0.91$, d represents a molar ratio of oxygen atoms, and $1.5 \leq d \leq 2$ is satisfied); and
    ruthenium (Ru) supported on the composite oxide carrier.

2. The ammonia synthesis catalyst according to claim 1, wherein the lanthanide other than Ce is at least one selected from the group consisting of lanthanum (La) and praseodymium (Pr).

3. The ammonia synthesis catalyst according to claim 1, wherein the additive metal element is at least one selected from the group consisting of Ti, Zr, Al, and Si.

4. A method of synthesizing ammonia, the method comprising
    bringing a gas containing hydrogen and nitrogen into contact with the ammonia synthesis catalyst according to claim 1 to synthesize ammonia.

5. A method of producing an ammonia synthesis catalyst, the method comprising: forming a composite oxide carrier by a polymerized complex method using a composite oxide precursor solution containing a salt of cerium (Ce), a salt of a lanthanide other than Ce, and a salt of at least one additive metal element selected from the group consisting of titanium (Ti), zirconium (Zr), hafnium (Hf), aluminum (Al), gallium (Ga), indium (In), silicon (Si), germanium (Ge), and tin (Sn) at a ratio in which x and y satisfy $0.1 \leq x \leq 0.9$, $0.01 \leq y \leq 0.3$, and $0.11 \leq x+y \leq 0.91$ when x represents a molar fraction of Ce, y represents a molar fraction of the additive metal element, and 1−x−y represents a molar fraction of a lanthanide other than Ce, such that the additive metal element is solid-solutionized in a composite oxide containing Ce and a lanthanide other than Ce; and
    depositing ruthenium (Ru) on the composite oxide carrier to obtain a catalyst in which Ru is supported on the composite oxide carrier.

* * * * *